United States Patent
Yu et al.

(10) Patent No.: US 10,959,210 B2
(45) Date of Patent: Mar. 23, 2021

(54) DOWNLINK REFERENCE RESOURCE SELECTION FOR UPLINK TRANSMISSIONS

(71) Applicant: Intel Corporation, Santa Clara, CA (US)

(72) Inventors: Zhibin Yu, Unterhaching (DE); Yushu Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/401,882

(22) Filed: May 2, 2019

(65) Prior Publication Data

US 2019/0261320 A1 Aug. 22, 2019

Related U.S. Application Data

(60) Provisional application No. 62/677,988, filed on May 30, 2018.

(51) Int. Cl.

| | |
|---|---|
| *H04L 12/28* | (2006.01) |
| *H04W 72/02* | (2009.01) |
| *H04W 56/00* | (2009.01) |
| *H04W 24/08* | (2009.01) |
| *H04W 76/27* | (2018.01) |
| *H04L 5/00* | (2006.01) |
| *H04W 72/04* | (2009.01) |
| *H04J 1/16* | (2006.01) |
| *H04W 48/12* | (2009.01) |

(52) U.S. Cl.
CPC ............ *H04W 72/02* (2013.01); *H04L 5/00* (2013.01); *H04L 5/0048* (2013.01); *H04W 24/08* (2013.01); *H04W 56/001* (2013.01); *H04W 72/042* (2013.01); *H04W 76/27* (2018.02); *H04W 48/12* (2013.01)

(58) Field of Classification Search
CPC .................... H04L 25/0224; H04W 52/242
USPC ........................................ 370/252, 329, 386
See application file for complete search history.

(56) References Cited

U.S. PATENT DOCUMENTS

| | | | | |
|---|---|---|---|---|
| 2018/0115363 A1* | 4/2018 | Abedini | .............. | H04W 52/146 |
| 2019/0159136 A1* | 5/2019 | MolavianJazi | .... | H04W 72/1284 |
| 2019/0349867 A1* | 11/2019 | MolavianJazi | ..... | H04W 52/242 |

OTHER PUBLICATIONS

Samsung, "CR to TS 38.213 capturing the RAN1#92bis meeting agreements," 3GPP TSG-RAN1 Meeting #92bis, R1-1805795, Change Request, 38.213, CR 0002, current version: 15.1.0, Apr. 16-20, 2018, Sanya, China, 95 pages.
3GPP, "Technical Specification Group Radio Access Network; NR; Radio Resource Control (RRC) protocol specification (Release 15)," 3GPP TS 38.331 V15.1.0 (Mar. 2018), 5G, 268 pages.
3GPP, "Technical Specification Group Radio Access Network; NR; Physical layer procedures for control (Release 15)," 3GPP TS 38.213 V15.1.0 (Mar. 2018), 5G, 77 pages.

* cited by examiner

*Primary Examiner* — John Pezzlo
(74) *Attorney, Agent, or Firm* — Schwabe, Williamson & Wyatt, P.C.

(57) ABSTRACT

Embodiments of the present disclosure describe configuration of spatial and power control parameters for uplink transmissions. Other embodiments may be described and claimed.

12 Claims, 9 Drawing Sheets

DOWNLINK REFERENCE RESOURCE SELECTION FOR UPLINK TRANSMISSIONS

CROSS REFERENCE TO RELATED APPLICATION

The present application claims priority to U.S. Provisional Patent Application No. 62/677,988, filed May 30, 2018, and entitled "Downlink Reference Resource Selection for Uplink Transmissions." The disclosure of this provisional application is hereby incorporated by reference in its entirety.

FIELD

Embodiments of the present invention relate generally to the technical field of wireless communications.

BACKGROUND

Fifth generation (5G) networks may employ complex beamforming to organize efficient communication of uplink and downlink signals. The beamforming may adjust transmission or reception elements in a manner to provide directional signal transmission or reception.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
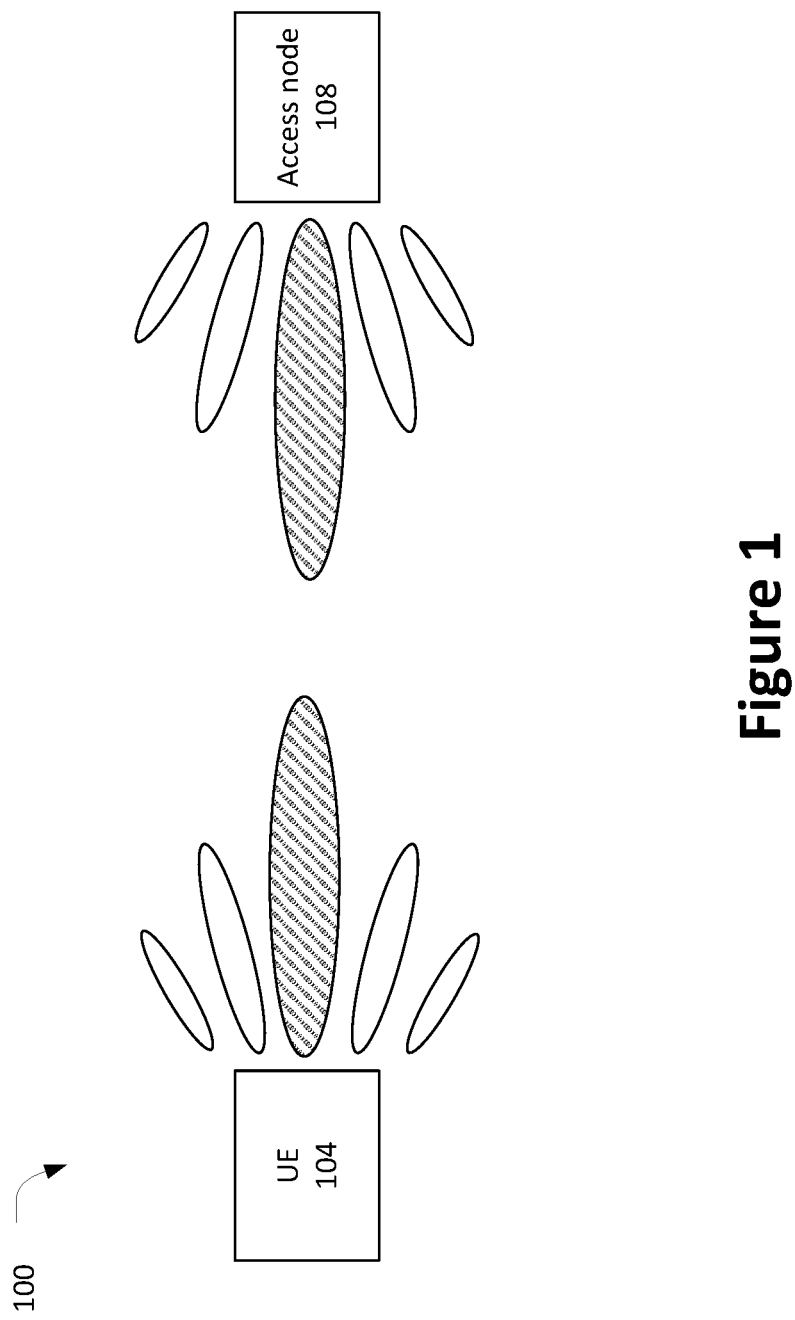
FIG. 1 illustrates a network in accordance with some embodiments.

FIG. 1 illustrates a network 100 in accordance with some embodiments. The network 100 may be a 5G network having a UE 104 and an access node 108 communicatively coupled with one another. The UE 104 and access node 108 may be similar to like-named components described elsewhere in this disclosure such as, but not limited to, UEs 401/402 and RAN nodes 411/412 described with respect to FIG. 4.

The UE 104 and the access node 108 may each include components that enable uplink beamforming. For example, the UE 104 may include transmit-beamforming components that cause the uplink transmission to be stronger on a selected transmission (Tx) beam (shown as cross hatched) as compared to the non-selected beams. The access node 108 may include a receive-beamforming components that cause reception of the uplink transmission to be more sensitive on a selected reception (Rx) beam (also shown as cross hatched). Various embodiments describe uplink beam management and power control techniques that facilitate the selection/adjustment of these Tx/Rx beams.

For 5G New Radio (NR) uplink beam management, when Uplink/Downlink (UL/DL) correspondence holds, the spatial association between a Physical Uplink Control Channel (PUCCH) resource and a downlink (DL) reference resource may be indicated by Radio Resource Control (RRC) signaling through a PUCCH-spatialrelationinfo parameter. See, for example, Third Generation Partnership Project (3GPP) Technical Specification (TS) 38.213, v15.1.0 (2018-04-08), Section 9.2.2. The DL reference resource may be a synchronization signal block (SSB) signal or channel state information reference signal (CSI-RS). The SSB may include a primary synchronization signal (PSS), a secondary synchronization signal (SSS), and/or a Physical Broadcast Channel (PBCH) signal. The SSB may also be referred to as SS/PBCH block. The PUCCH-spatialrelationinfo parameter may be included in a PUCCH-Config information element (IE), which may be used to configure UE-specific PUCCH parameters per bandwidth part (BWP). For example, the PUCCH-spatialrelationinfo parameter may be included in a PUCCH-SpatialRelationInfo IE that is used to configure a spatial setting for PUCCH transmission and parameters for PUCCH power control. See, for example, 3GPP TS 38.331, v15.1.0 (2018-04-02), Section 6.3.2.

For 5G NR uplink power control, the pathloss DL reference resource (e.g., an SSB signal or CSI-RS) for calculating PUCCH transmission power may be indicated by RRC through a PUCCH-pathlossReferenceRS parameter. See, for example, 3GPP TS 38.213, Section 7.3.1.

For 5G NR uplink power control, the pathloss DL reference resource (for example, an SSB signal or CSI-RS) for calculating Sounding Reference Signal (SRS) transmission power may be indicated by RRC signaling through a pathlossReferenceRS parameter. See, for example, 3GPP TS 38.213, Section 7.3.1. The pathlossReferenceRS parameter may be part of an SRS resource set configuration that contains a target SRS resource that is to be transmitted by the UE 104.

In various embodiments, the pathlossReferenceRS parameter and/or the PUCCH-PathlossReferenceRS parameter may be included in a PUCCH-PowerControl IE or some other suitable IE.

It may be that PUCCH-spatialrelationinfo parameter for PUCCH Tx beam setting and the pathlossReferenceRS parameter within an SRS resource set for SRS power calculation are optional fields in RRC.

If the PUCCH-spatialrelationinfo parameter is not be provided by the network (via the access node 108) to the UE 104, the UE 104 may not be able to associate the UE Rx beam with the UE Tx beam even when a UL/DL correspondence holds.

If the pathlossReferenceRS parameter within an SRS resource is not provided by the network to the UE 104, the UE 104 may not be able to derive the pathloss information for calculating the SRS transmission power.

The UE behavior in scenarios where the pathlossReferenceRS parameter within an SRS resource set is not configured by RRC is not defined by the current 3GPP specifications.

The UE behavior when PUCCH-spatialrelationinfo is not configured by RRC is currently defined to fall back to use the same UE spatial domain transmission filter used for physical uplink shared channel (PUSCH) message 3 (MSG3) transmission. However, the DL reference association is missing and the initial UE spatial domain transmission filter used for PUSCH MSG3 transmission can be out-of-date due to UE mobility.

For these reasons, uplink performance degradation may occur when pathlossReferenceRS within an SRS resource set or PUCCH-spatialrelationinfo is not configured by the network.

Embodiments of this disclosure provide fallback mechanisms for DL reference resource selection when pathlossReferenceRS within an SRS resource set or PUCCH-spatialrelationinfo is not configured to the UE 104. This may improve UL robustness for both PUCCH beam setting in frequency range 2 (FR2), in the event PUCCH-spatialrelationinfo is not configured; and for SRS power control for both frequency range 1 (FR1) and FR2 in the event pathlossReferenceRS within an SRS resource set is not configured. FR1 may refer to a frequency range of 450 MHz-6,000 MHz; while FR2 may refer to a frequency range of 24,250 MHz-52,600 MHz.

In some embodiments, the DL reference resource can be selected to be the SSB in which the UE 104 successfully decodes the master information block (MIB). Some embodiments may select the DL reference resource to be a DL reference resource that is spatially quasi-co-located (QCLed) with the SSB in which the UE 104 successfully decodes the MIB.

Uplink power control of the PUCCH is described in section 7.3.1 of 3GPP TS 38.213, and, as updated based on Change Requests from R1-1805795, 3GPP TSG-RAN1 Meeting#92bis, Sanya, China, Apr. 16-20, 2018, reads as follows:

If a UE transmits a PUCCH on active UL BWP b of carrier f in the primary cell c using PUCCH power control adjustment state with index l, the UE determines the PUCCH transmission power $P_{PUCCH,b,f,c}(i, q_u, q_d, l)$ in PUCCH transmission period i as $$P_{PUCCH,b,f,c}(i, q_u, q_d, l) = \min \begin{Bmatrix} P_{CMAX,f,c}(i), \\ P_{O\_PUCCH,b,f,c}(q_u) + 10\log_{10} \\ (2^\mu \cdot M_{RB,b,f,c}^{PUCCH}(i)) + PL_{b,f,c}(q_d) + \Delta_{F\_PUCCH}(F) + \\ \Delta_{TF,b,f,c}(i) + g_{b,f,c}(i, l) \end{Bmatrix} [dBm]$$

where:

$P_{CMAX,f,c}$ is the configured UE transmit power defined in [3GGP TS 38.101-1, v15.1.0 (2018-04-06)] and [3GPP TS 38.101-2, v15.1.0 (2018-04-06)] for carrier f of serving cell c in PUCCH transmission period i.

$P_{O\_PUCCH,b,f,c}(q_s)$ is a parameter composed of the sum of a component $P_{O\_NOMINAL\_PUCCH}$ provided by higher layer parameter p0-nominal for carrier f of primary cell c, and a component $P_{O\_UE\_PUCCH}(q_u)$ provided by higher layer parameter p0-PUCCH-Value in P0-PUCCH for UL BWP b of carrier f of primary cell c, where $0 \le q_u < Q_u \cdot Q_u$ a is a size for a set of values provided by higher layer parameter maxNrofPUCCH-P0-PerSet. The set of $P_{O\_UE\_PUCCH}$ values is provided by higher layer parameter p0-Set . . . .

$M_{RB,b,f,c}^{PUCCH}(i)$ is the bandwidth of the PUCCH resource assignment expressed in number of resource blocks for PUCCH transmission period i on UL BWP b of carrier f of serving cell c and μ is defined in [3GPP TS 38.211, v15.1.0 (2018-04-03)].

$PL_{b,f,c}(q_d)$ is a downlink path-loss estimate in dB calculated by the UE using reference signal (RS) index $q_d$ for a DL BWP that is paired with UL BWP b of carrier f of serving cell c.

$PL_{b,f,c}(q_d)$ is a downlink path-loss estimate in dB calculated by the UE using reference signal (RS) index $q_d$ for a DL BWP that is paired with UL BWP b of carrier f of the primary cell c . . . .

The parameter $\Delta_{F\_PUCCH}(F)$ is provided by higher layer parameter deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4.

$\Delta_{TF,b,f,c}(i)$ is a PUCCH transmission power adjustment component for UL BWP b of carrier f of primary cell c . . . .

Figure 2:
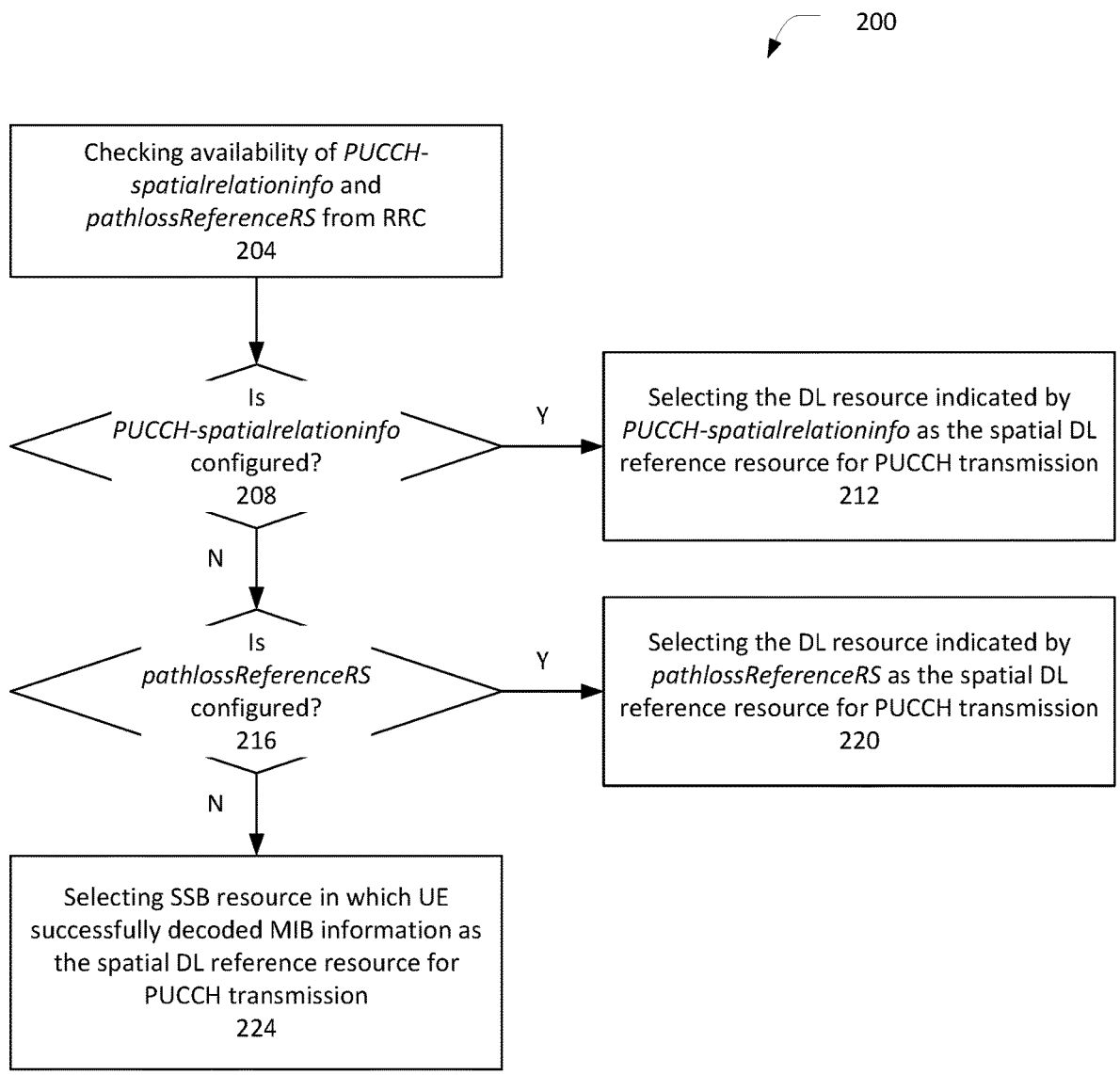
FIG. 2 illustrates an operation flow/algorithmic structure in accordance with some embodiments.

$g_{b,f,c}(i,l) = g_{b,f,c}(i=1,l) + \delta_{PUCCH,b,f,c}(i-K_{PUCCH},l)$ is the current PUCCH power control adjustment state and $g_{b,f,c}(0,l)=0$ is the first value after reset PUCCH spatial DL reference resource selection still needs to be address in the case certain parameters, for example, PUCCH-spatialrelationinfo and pathlossReferenceRS, are not configured. FIG. 2 provides such an example.

FIG. 2 illustrates an operation flow/algorithmic structure 200 for PUCCH spatial DL reference resource selection according to various embodiments. The operation flow/algorithmic structure 200 may be performed/implemented by the UE 104 or components thereof, for example, baseband circuitry disposed within the UE 104.

At 204, the operation flow/algorithmic structure 200 may include checking availability of PUCCH-spatialrelationinfo and pathlossReferenceRS from RRC. If the parameters were receiving in RRC signaling, which may have taken place during RRC configuration (or reconfiguration), the parameters would be stored in memory of the UE 104. Thus, the checking of the availability may include checking memory of the UE 104 to determine whether the parameters are stored therein.

At 208, the operation flow/algorithmic structure 200 may include determining whether the PUCCH-spatialrelationinfo is configured. If PUCCH-spatialrelationinfo is configured, which may be determined if a corresponding parameter is available in the memory of the UE 104, the operation flow/algorithmic structure 200 may advance to 212.

At 212, the operation flow/algorithmic structure 200 may include selecting the DL resource indicated by the PUCCH-spatialrelationinfo as the spatial DL reference resource for PUCCH transmission. When the spatial DL reference resource is selected, the corresponding target PUCCH resource can be transmitted using the same spatial domain filter that was used for the DL reception of the reference resource.

If it is determined, at 208, that PUCCH-spatialrelationinfo is not configured, for example, a corresponding parameter is not available in the memory of the UE 104, the operation flow/algorithmic structure 200 may advance to 216.

At 216, the operation flow/algorithmic structure 200 may include determining whether the pathlossReferenceRS is configured. If pathlossReferenceRS is configured, which may be determined if a corresponding parameter is available in the memory of the UE 104, the process may advance to 220.

At 220, the operation flow/algorithmic structure 200 may include selecting the DL resource indicated by the pathlossReferenceRS as the spatial DL reference resource for PUCCH transmission. As described above, when the spatial DL reference resource is selected, the corresponding target PUCCH resource can be transmitted using the same spatial domain filter that was used for the DL reception of the reference resource.

If it is determined, at 216, that pathlossReferenceRS is not configured, for example, a corresponding parameter is not available in the memory of the UE 104, the process may advance to 224.

At 224, the operation flow/algorithmic structure 200 may include selecting an SSB resource in which the UE 104 successfully decoded MIB information as the spatial DL reference resource for a PUCCH transmission.

Following the determination spatial DL reference resource, the UE 104 may generate and transmit a PUCCH transmission on a target PUCCH resource, using the same spatial domain filter that was used for the DL reception of the reference resource.

Uplink power control of the SRS is described in section 7.3.1 of 3GPP TS 38.213, and, as updated based on R1-1805795, reads as follows:

For SRS, the linear value $\hat{P}_{SRS,b,f,c}(i,q_s,l)$ of the transmit power $PSR_{S,b,f,c}(i,q_s,l)$ on UL BWP b of carrier f of serving cell c is split equally across the configured antenna ports for SRS. The UL BWP b is the active UL BWP.

If a UE transmits SRS on UL BWP b of carrier f of serving cell c using SRS power control adjustment state with index l, the UE determines the SRS transmission power $P_{SRS,b,f,c}(i,g_s,l)$ in SRS transmission period i as:

$$P_{SRS,b,f,c}(i, q_s, l) = \min \left\{ \begin{array}{c} P_{CMAX,f,c}(i), \\ P_{O\_SRS,b,f,c}(q_s) + 10 \log_{10} \\ (2^\mu \cdot M_{SRS,b,f,c}(i)) + \alpha_{SRS,b,f,c}(q_s) \cdot PL_{b,f,c}(q_d) + \\ h_{b,f,c}(i, l) \end{array} \right\} [dBm]$$

where, $P_{CMAX,f,c}(i)$ is the configured UE transmit power defined in [3GGP TS 38.101-1] and [3GPP TS 38.101-2] for carrier f of serving cell c in SRS transmission period i.

$P_{O\_SRS,b,f,c}(q_s)$ is provided by higher layer parameter p0 for UL BWP b of carrier f of serving cell c and SRS resource set $q_s$ provided by higher layer parameters SRS-ResourceSet and SRS-ResourceSetId.

$M_{SRS,b,f,c}(i)$ is the SRS bandwidth expressed in number of resource blocks for SRS transmission period i on UL BWP b of carrier f of serving cell c and μ is defined in [3GPP TS 38.211].

$\alpha_{SRS,b,f,c}(q_s)$ is provided by higher layer parameter alpha for UL BWP b of carrier f of serving cell c and SRS resource set $q_s$.

$PL_{b,f,c}(q_d)$ is a downlink path-loss estimate in dB calculated by the UE using reference signal (RS) index $q_d$ for a DL BWP that is paired with UL BWP b of carrier f of serving cell c and SRS resource set $q_s$ [3GPP TS 38.214, v15.1.0 (2018-04-09)]. The RS index $q_d$ is provided by higher layer parameter pathlossReferenceRS associated with the SRS resource set $q_s$ and is either a higher layer parameter ssb-Index providing a SS/PBCH block index or a higher layer parameter csi-RS-Index providing a CSI-RS resource index.

Figure 3:
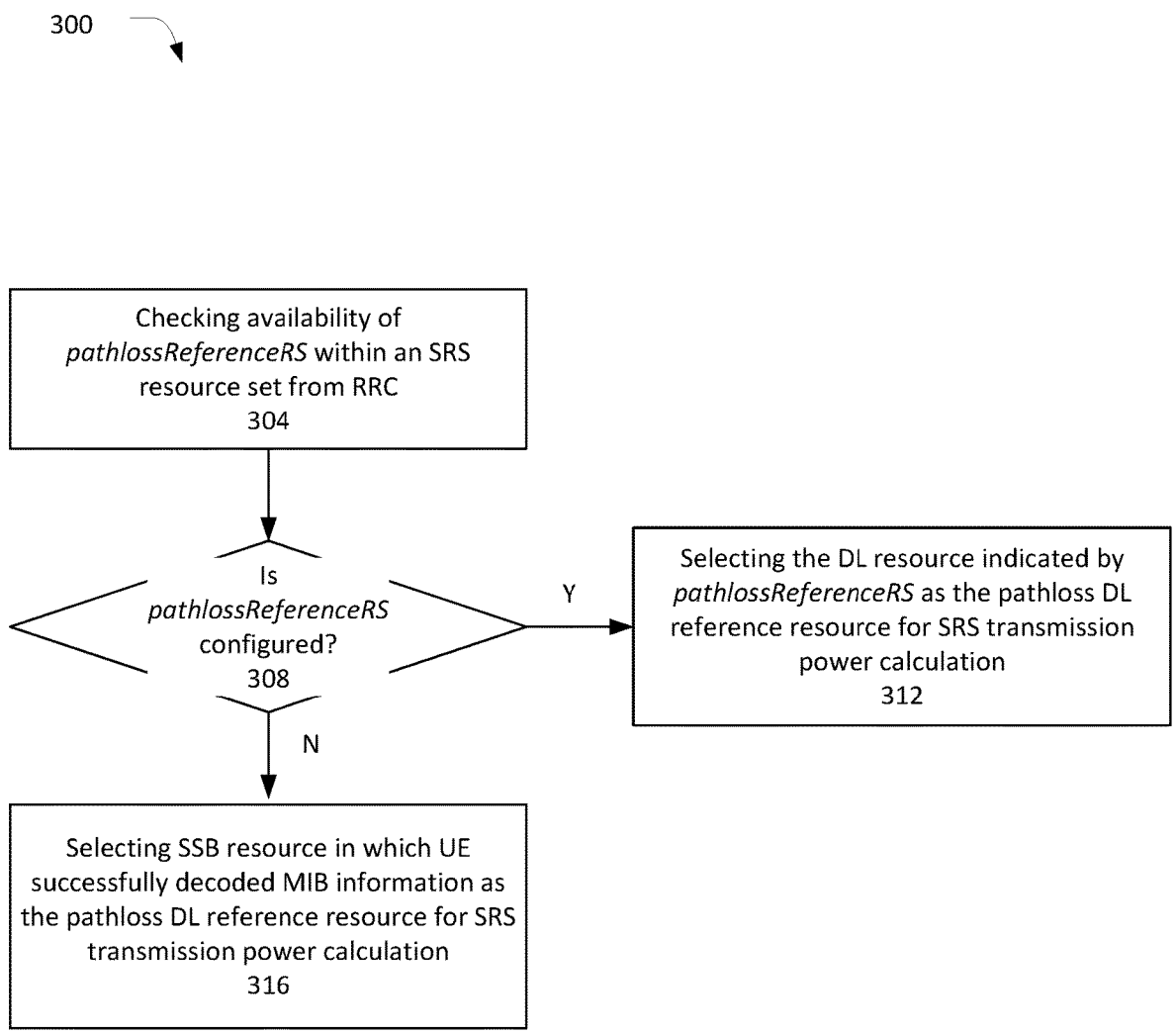
FIG. 3 illustrates another operation flow/algorithmic structure in accordance with some embodiments.

However, as described above, in some instances a DL reference resource for pathloss estimation may not be configured by higher-layer signaling. Thus, in some embodiments, one SSB may be used for pathloss estimation for SRS power control. The SSB may be predefined, for example, the SSB identified during initial access or the SSB with a fixed SSB index, or the SSB can be selected by the UE 104 based on a measurement performed by the UE 104. FIG. 3 illustrates an example of one such embodiment.

FIG. 3 illustrates an operation flow/algorithmic structure 200 for SRS pathloss DL reference resource selection according to various embodiments. The operation flow/algorithmic structure 300 may be performed/implemented by the UE 104 or components thereof, for example, baseband circuitry disposed within the UE 104.

The operation flow/algorithmic structure 300 may include, at 304, checking and availability of pathlossReferenceRS within an SRS resource set from RRC. If the parameter was received in RRC signaling during configuration of the SRS resource set that contains a target SRS to be transmitted by the UE 104, it will be stored in the memory of the UE 104. Thus, the checking of the availability may include checking memory of the UE 104 to determine whether the parameter is stored therein.

The operation flow/algorithmic structure 300 may further include, at 308, determining whether the pathlossReferenceRS is configured. If the pathlossReferenceRS is configured, which may be determined if the corresponding parameter is available in the memory of the UE 104, the operation flow/algorithmic structure 300 may advance to 312.

At 312, the operation flow/algorithmic structure 300 may include selecting the DL resource indicated by the pathlossReferenceRS parameter as the pathloss DL reference resource for SRS transmission power calculation. In some embodiments, if the UE 104 is provided with higher-layer parameter pathlossReferenceRS, the RS resource index $q_d$ may be provided by the pathlossReferenceRS parameter that is associated with the SRS resource set $q_s$. The RS index $q_d$ may either be a higher-layer parameter ssb-Index providing an SS/PBCH block index or a higher layer parameter csi-RS-Index providing an CSI-RS resource index.

The SRS power calculation may be similar to that described above in TS 38.213; however, $PL_{b,f,c}(q_s)$ may be replaced with $PL_{b,f,c}(q_d)$, which may be a downlink pathloss estimate in dB calculated by the UE 104 using RS resource index $q_d$ for the active DL BWP of serving cell c and SRS resource set $q_s$.

If it is determined, at 308, that pathlossReferenceRS is not configured, for example, a corresponding parameter is not available in the memory of the UE 104, the operation flow/algorithmic structure 300 may advance to 316.

At 316, the operation flow/algorithmic structure 300 may include selecting an SSB resource in which the UE 104 successfully decoded MIB information as the pathloss DL reference resource for SRS transmission power calculation. In some embodiments, if the UE is not provided with the higher-layer parameter pathlossReferenceRS, the UE 104 may calculate $PL_{b,f,c}(q_d)$ using an RS resource obtained from the SS/PBCH block (for example, SSB) by which the UE 104 obtained higher-layer parameter MasterInformationBlock. The UE 104 may then calculate the SRS power based on $PL_{b,f,c}(q_d)$.

The UE 104 may generate and transmit an SRS with the calculated power.

In some embodiments, the pathlossReferenceRS may always be present in an SRS configuration. For example, the parameter may be a required parameter instead of an optional one. In this case, the UE 104 may use the indicated DL reference resource to estimate the pathloss for SRS power control.

In some embodiments, if there is no SSB in an active BWP, the UE 104 may expect the access node 108 to configure the DL reference resource for pathloss estimation by higher layer signaling for PUSCH/PUCCH/SRS. Further, the UE 104 may expect the configured DL reference resource to be transmitted in the active BWP in the current component carrier (CC) or another CC.

In some embodiments, if there is no SSB in the active BWP, the UE 104 may use one SSB in another CC where it can decode MIB successfully to measure the downlink path-loss for power control. The CC index could be fixed, for example, PCell or CC with lowest CC ID, or configured by higher layer signaling.

In some embodiments, if there is no SSB in the active BWP, the UE 104 may use one CSI-RS within the active BWP for pathloss estimation. The CSI-RS may be spatially QCLed with an SSB in which the UE correctly decoded the MIB. The SSB having the correctly decoded MIB may have been transmitted in an initial (or previous) BWP that differs from the active BWP in which there is no SSB.

Figure 4:
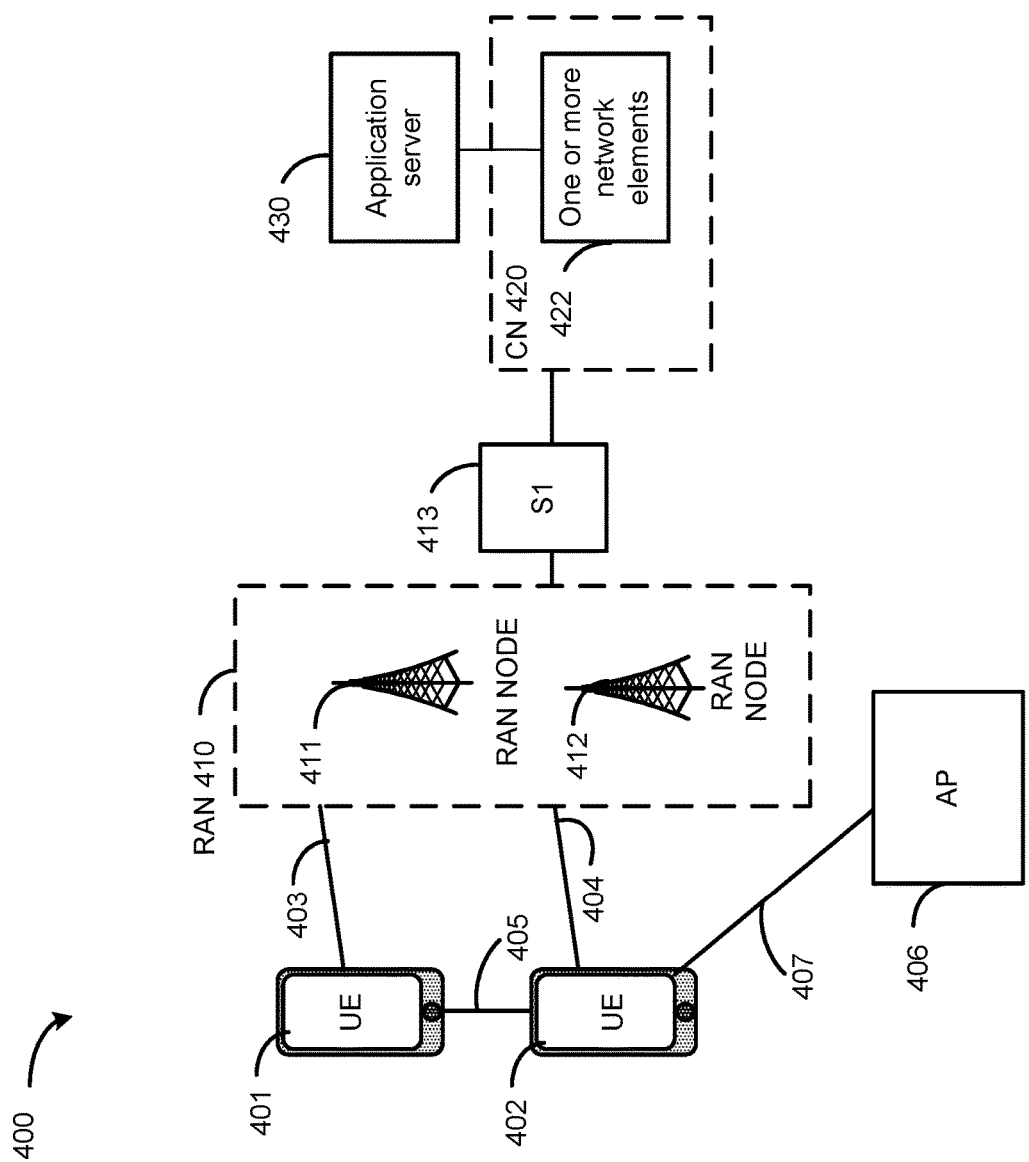
FIG. 4 illustrates an architecture of a system of a network in accordance with some embodiments.

FIG. 4 illustrates an example architecture of a system 400 of a network is shown, in accordance with various embodiments. The system 400 may include UEs 401/402 that may be similar to and substantially interchangeable with UE 104. The system 400 may further include radio access network (RAN) nodes 411/412 that may be similar to and substantially interchangeable with an access node 108.

The following description is provided for an example system 400 that operates in conjunction with the as Long Term Evolution (LTE) system standards and the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as future 3GPP systems (e.g., Sixth Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 4, the system 400 may include UE 401 and UE 402. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 401 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 401/402 can comprise an IoT UE, which may comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 401/402 may be configured to connect, for example, communicatively couple, with an access network (AN) or RAN 410. In embodiments, the RAN 410 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 410 that operates in an NR or 5G system 400, and the term "E-UTRAN" or the like may refer to a RAN 410 that operates in an LTE or 4G system 400. The UEs 401/402 utilize connections (or channels) 403 and 404, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 401 may directly exchange communication data via a ProSe interface 405. The ProSe interface 405 may alternatively be referred to as a sidelink (SL) interface 405 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 (also referred to as also referred to as "WLAN node 406", "WLAN 406", "WLAN Termination 406" or "WT 406" or the like) via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below). In various embodiments, the UE 402, RAN 410, and AP 406 may be configured to utilize LTE-WLAN aggregation (LWA) operation and/or WLAN LTE/WLAN Radio Level Integration with IPsec Tunnel (LWIP) operation. The LWA operation may involve the UE 402 in RRC_CONNECTED being configured by a RAN node 411/412 to utilize radio resources of LTE and WLAN. LWIP operation may involve the UE 402 using WLAN radio resources (e.g., connection 407) via Internet Protocol Security (IPsec) protocol tunneling to authenticate and encrypt packets (e.g., internet protocol (IP) packets) sent over the connection 407. IPsec tunneling may include encapsulating entirety of original IP packets and adding a new packet header thereby protecting the original header of the IP packets.

The RAN 410 can include one or more AN nodes or RAN nodes 411/412 that enable the connections 403 and 404. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node that operates in an NR or 5G system 400 (for example a gNB), and the term "E-UTRAN node" or the like may refer to a RAN node that operates in an LTE or 4G system 400 (e.g., an eNB). According to various embodiments, the RAN nodes 411/412 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 411/412 may be implemented as one or more software entities running on server computers as part of a virtual network, which may be referred to as a cloud radio access network (CRAN). In other embodiments, the RAN nodes 411/412 may represent individual gNB-distributed units (DUs) that are connected to a gNB-centralized unit (CU) via an F1 interface (not shown by FIG. 4).

Any of the RAN nodes 411/412 can terminate the air interface protocol and can be the first point of contact for the UEs 401. In some embodiments, any of the RAN nodes 411/412 can fulfill various logical functions for the RAN 410 including, but not limited to, radio network controller (RNC) functions such as radio bearer management, uplink and downlink dynamic radio resource management and data packet scheduling, and mobility management.

In embodiments, the UEs 401 can be configured to communicate using Orthogonal Frequency-Division Multiplexing (OFDM) communication signals with each other or with any of the RAN nodes 411/412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411/412 to the UEs 401, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401. The physical downlink control channel (PDCCH) may carry information about the transport format and resource allocations related to the PDSCH channel, among other things. It may also inform the UEs 401 about the transport format, resource allocation, and H-ARQ (Hybrid Automatic Repeat Request) information related to the uplink shared channel. Typically, downlink scheduling (assigning control and shared channel resource blocks to the UE 402 within a cell) may be performed at any of the RAN nodes 411/412 based on channel quality information fed back from any of the UEs 401. The downlink resource assignment information may be sent on the PDCCH used for (e.g., assigned to) each of the UEs 401.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 411/412 may be configured to communicate with one another via interface 412. In embodiments where the system 400 is an LTE system, the interface 412 may be an X2 interface 412. The X2 interface may be defined between two or more RAN nodes 411/412 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 401 from an SeNB for user data; information of PDCP PDUs that were not delivered to a UE 401; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 400 is a 5G or NR system, the interface 412 may be an Xn interface 412. The Xn interface is defined between two or more RAN nodes 411/412 (e.g., two or more gNBs and the like) that connect to 5GC 420, between a RAN node 411/412 (e.g., a gNB) connecting to 5GC 420 and an eNB, and/or between two eNBs connecting to 5GC 420. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 401 in a connected mode (e.g., CM-CONNECTED) including functionality to manage the UE mobility for connected mode between one or more RAN nodes 411. The mobility support may include context transfer from an old (source) serving RAN node 411 to new (target) serving RAN node 412; and control of user plane tunnels between old (source) serving RAN node 411 to new (target) serving RAN node 412. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 410 is shown to be communicatively coupled to a core network—in this embodiment, Core Network (CN) 420. The CN 420 may comprise a plurality of network elements 422, which are configured to offer various data and telecommunications services to customers/subscribers (e.g., users of UEs 401) who are connected to the CN 420 via the RAN 410. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 420 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 420 may be referred to as a network slice, and a logical instantiation of a portion of the CN 420 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 430 may be an element offering applications that use IP bearer resources with the core network (e.g., UMTS Packet Services (PS) domain, LTE PS data services, etc.). The application server 430 can also be configured to support one or more communication services (e.g., Voice-over-Internet Protocol (VoIP) sessions, PTT sessions, group communication sessions, social networking services, etc.) for the UEs 401 via the EPC 420.

In embodiments, the CN 420 may be a 5GC (referred to as "5GC 420" or the like), and the RAN 410 may be connected with the CN 420 via an NG interface 413. In embodiments, the NG interface 413 may be split into two parts, an NG user plane (NG-U) interface, which carries traffic data between the RAN nodes 411/412 and a user plane function (UPF), and the S1 control plane (NG-C) interface, which is a signaling interface between the RAN nodes 411/412 and Access and Mobility Functions (AMFs).

In embodiments, the CN 420 may be a 5G CN (referred to as "5GC 420" or the like), while in other embodiments, the CN 420 may be an Evolved Packet Core (EPC)). Where CN 420 is an EPC (referred to as "EPC 420" or the like), the RAN 410 may be connected with the CN 420 via an S1 interface 413. In embodiments, the S1 interface 43 may be split into two parts, an S1 user plane (S1-U) interface, which carries traffic data between the RAN nodes 411/412 and the serving gateway (S-GW), and the S1-mobility management entity (MME) interface, which is a signaling interface between the RAN nodes 411/412 and MMEs.

Figure 5:
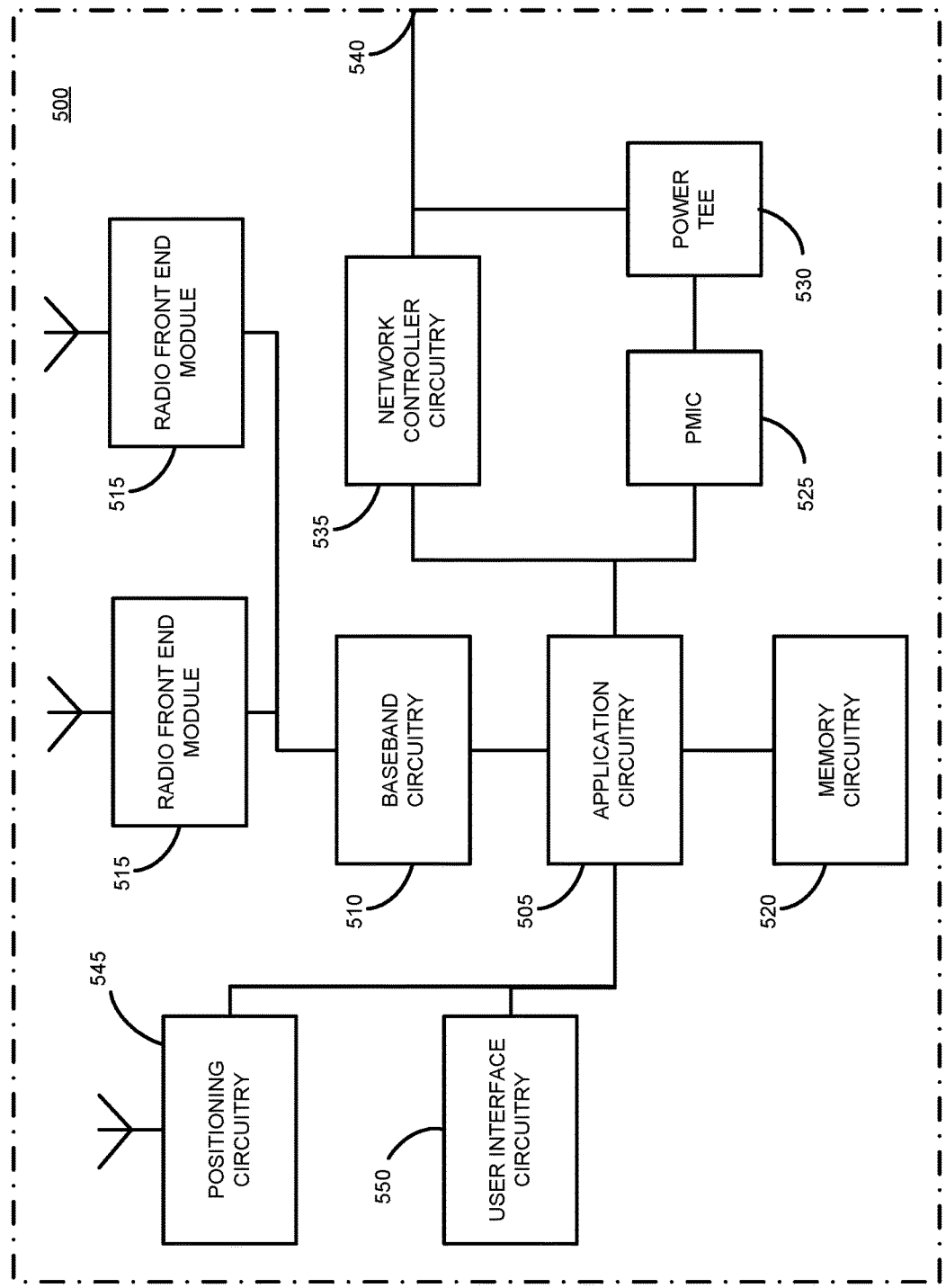
FIG. 5 illustrates an example of an infrastructure equipment in accordance with various embodiments.

FIG. 5 illustrates an example of infrastructure equipment 500 in accordance with various embodiments. The infrastructure equipment 500 (or "system 500") may be implemented as a base station, radio head, RAN node, etc., such as the RAN nodes 411/412 or access node 108 shown and described previously. In other examples, the system 500 could be implemented in or by a UE, application server(s) 430, and/or any other element/device discussed herein. The system 500 may include one or more of application circuitry 505, baseband circuitry 510, one or more radio front end modules 515, memory 520, power management integrated circuitry (PMIC) 525, power tee circuitry 530, network controller 535, network interface connector 540, satellite positioning circuitry 545, and user interface 550. In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 505 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 505 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 500 may not utilize application circuitry 505, and instead may include a special-purpose processor/controller to process IP data received from an EPC or 5GC, for example.

Additionally or alternatively, application circuitry 505 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric including and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EE- PROM), flash memory, static memory (e.g., static random access memory (SRAM), anti-fuses, etc.) used to store logic blocks, logic fabric, data, etc. in lookup-tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. Although not shown, baseband circuitry 510 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 510 may include protocol processing circuitry with one or more instances of control circuitry (not shown) to provide control functions for the digital baseband circuitry and/or radio frequency circuitry (e.g., the radio front end modules 515).

User interface circuitry 550 may include one or more user interfaces designed to enable user interaction with the system 500 or peripheral component interfaces designed to enable peripheral component interaction with the system 500. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 515 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 515. The RFEMs 515 may incorporate both millimeter wave antennas and sub-millimeter wave antennas.

The memory circuitry 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAIVI), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 530 may provide for electrical power drawn from a network cable to provide both power supply and data connectivity to the infrastructure equipment 500 using a single cable.

The network controller circuitry 535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 500 via network interface connector 540 using a physical connection, which may be electrical (commonly referred to as a "copper interconnect"), optical, or wireless. The network controller circuitry 535 may include one or more dedicated processors and/or FPGAs to communicate using one or more of the aforementioned protocol. In some implementations, the network controller circuitry 535 may include multiple controllers to provide connectivity to other networks using the same or different protocols.

The positioning circuitry 545, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 545 and/or positioning circuitry implemented by UEs 104/401/402 or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 545 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 545 may provide data to application circuitry 505 which may include one or more of position data or time data. Application circuitry 505 may use the time data to synchronize operations with other radio base stations (e.g., RAN nodes XQ11 or the like).

The components shown by FIG. 5 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 6:
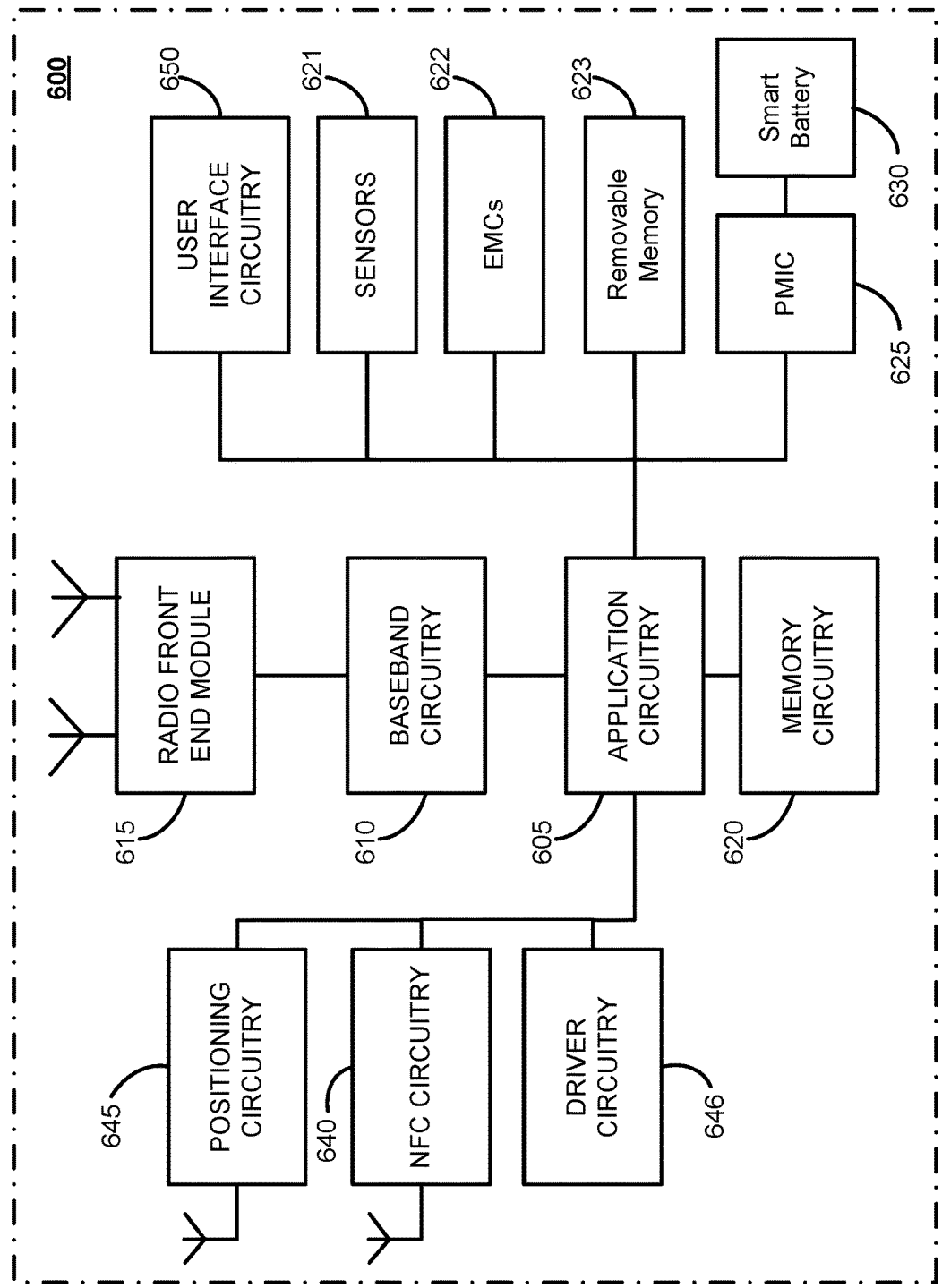
FIG. 6 illustrates an example platform in accordance with various embodiments.

FIG. 6 illustrates an example of a platform 600 (or "device 600") in accordance with various embodiments. In embodiments, the computer platform 600 may be suitable for use as UEs 104/401/402, application servers 430, and/or any other element/device discussed herein. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

The application circuitry 605 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 600. In some embodiments, processors of application circuitry 505/605 may process IP data packets received from an EPC or 5GC.

Application circuitry 605 be or include a microprocessor, a multi-core processor, a multithreaded processor, an ultra-low voltage processor, an embedded processor, or other known processing element. In one example, the application circuitry 605 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 605 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 605 may be a part of a system on a chip (SoC) in which the application circuitry 605 and other components are formed into a single integrated circuit, or a single package, such as the Edison™ or Galileo™ SoC boards from Intel® Corporation.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric including and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include any number and type of memory devices used to provide for a given amount of system memory. As examples, the memory circuitry 620 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 620 may be developed in accordance with a Joint Electron Devices Engineering Council (JEDEC) low power double data rate (LPDDR)-based design, such as LPDDR2, LPDDR3, LPDDR4, or the like. Memory circuitry 620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) cross-point (XPOINT) memories from Intel® and Micron®.

Removable memory circuitry 623 may include devices, circuitry, enclosures/housings, ports or receptacles, etc. used to coupled portable data storage devices with the platform 600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry may include sensors 621, such as accelerometers, level sensors, flow sensors, temperature sensors, pressure sensors, barometric pressure sensors, and the like. The interface circuitry may be used to connect the platform 600 to electro-mechanical components (EMCs) 622, which may allow platform 600 to change its state, position, and/or orientation, or move or control a mechanism or system. The EMCs 622 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 600 may be configured to operate one or more EMCs 622 based on one or more captured events and/or instructions or control signals received from a service provider and/or various clients.

In some implementations, the interface circuitry may connect the platform 600 with positioning circuitry 645, which may be the same or similar as the positioning circuitry 645 discussed with regard to FIG. 5.

In some implementations, the interface circuitry may connect the platform 600 with near-field communication (NFC) circuitry 640, which may include an NFC controller coupled with an antenna element and a processing device. The NFC circuitry 640 may be configured to read electronic tags and/or connect with another NFC-enabled device.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensors 621 and control and allow access to sensors 621, EMC drivers to obtain actuator positions of the EMCs 622 and/or control and allow access to the EMCs 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630, for example, when the device is included in a UE 104/401/402.

In some embodiments, the PMIC 625 may control, or otherwise be part of, various power saving mechanisms of the platform 600. For example, if the platform 600 is in an RRC_Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC_Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 600 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among others.

Figure 7:
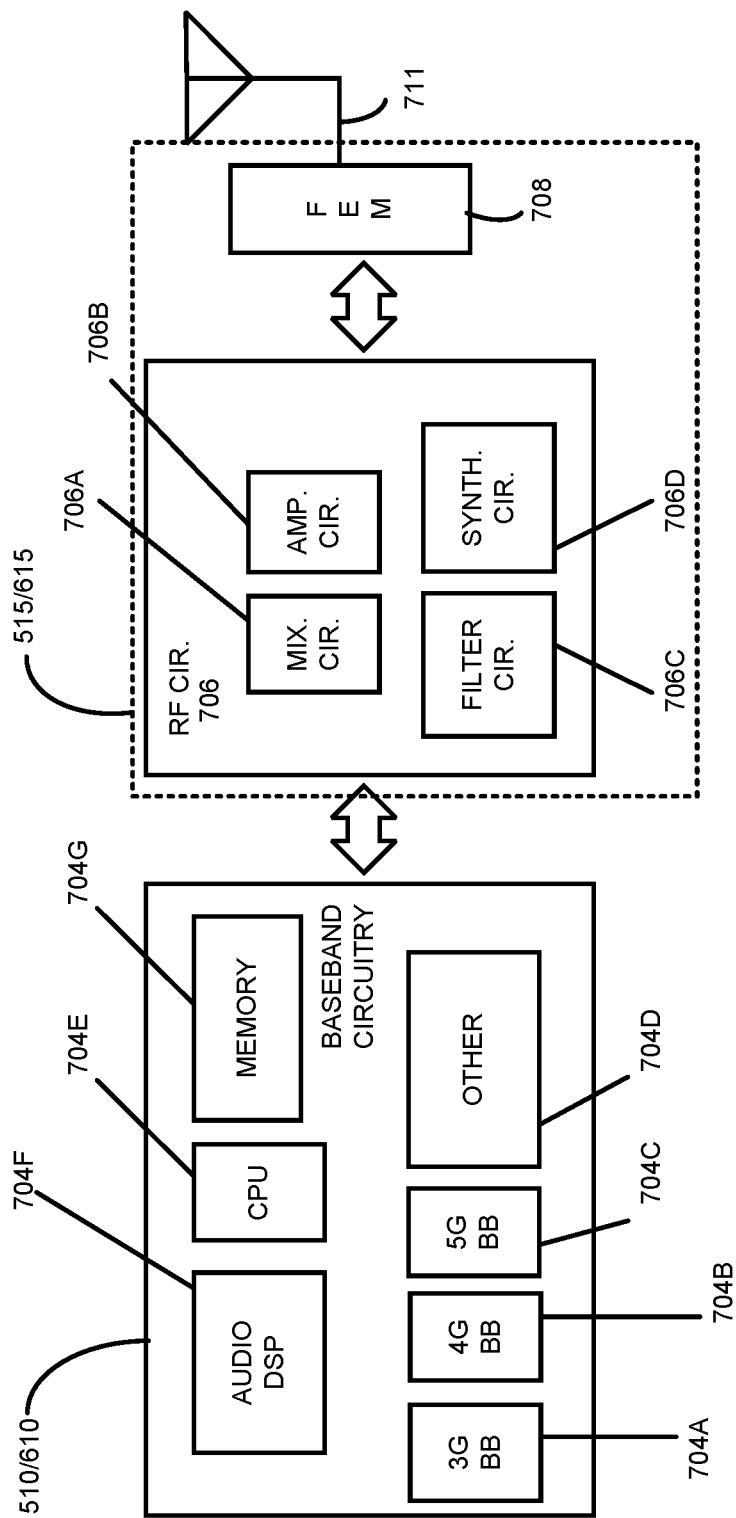
FIG. 7 illustrates example components of baseband circuitry and radio front end modules in accordance with various embodiments.

FIG. 7 illustrates example components of baseband circuitry 510/610 and radio front end modules (RFEM) 515/615 in accordance with various embodiments. As shown, the RFEM 515/615 may include Radio Frequency (RF) circuitry 706, front-end module (FEM) circuitry 708, one or more antennas 711 coupled together at least as shown.

The baseband circuitry 510/610 may include circuitry such as, but not limited to, one or more single-core or multi-core processors. The baseband circuitry 510/610 may include one or more baseband processors or control logic to process baseband signals received from a receive signal path of the RF circuitry 706 and to generate baseband signals for a transmit signal path of the RF circuitry 706. Baseband processing circuity 510/610 may interface with the application circuitry 505/605 for generation and processing of the baseband signals and for controlling operations of the RF circuitry 706. For example, in some embodiments, the baseband circuitry 510/610 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 510/610 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 510/610 may include Fast-Fourier Transform (FFT), precoding, or constellation mapping/demapping functionality. In some embodiments, encoding/decoding circuitry of the baseband circuitry 510/610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 510/610 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 510/610 and the application circuitry 505/605 may be implemented together such as, for example, on a system on a chip (SOC).

In some embodiments, the baseband circuitry 510/610 may provide for communication compatible with one or more radio technologies. For example, in some embodiments, the baseband circuitry 510/610 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 510/610 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 510/610. RF circuitry 706 may also include a transmit signal path which may include circuitry to up-convert baseband signals provided by the baseband circuitry 510/610 and provide RF output signals to the FEM circuitry 708 for transmission.

In some embodiments, the receive signal path of the RF circuitry 706 may include mixer circuitry 706*a*, amplifier circuitry 706*b* and filter circuitry 706*c*. In some embodiments, the transmit signal path of the RF circuitry 706 may include filter circuitry 706*c* and mixer circuitry 706*a*. RF circuitry 706 may also include synthesizer circuitry 706*d* for synthesizing a frequency for use by the mixer circuitry 706*a* of the receive signal path and the transmit signal path. In some embodiments, the mixer circuitry 706*a* of the receive signal path may be configured to down-convert RF signals received from the FEM circuitry 708 based on the synthesized frequency provided by synthesizer circuitry 706*d*. The amplifier circuitry 706*b* may be configured to amplify the down-converted signals and the filter circuitry 706*c* may be a low-pass filter (LPF) or band-pass filter (BPF) configured to remove unwanted signals from the down-converted signals to generate output baseband signals. Output baseband signals may be provided to the baseband circuitry 510/610 for further processing. In some embodiments, the output baseband signals may be zero-frequency baseband signals, although this is not a requirement. In some embodiments, mixer circuitry 706*a* of the receive signal path may comprise passive mixers, although the scope of the embodiments is not limited in this respect.

In some embodiments, the mixer circuitry 706*a* of the transmit signal path may be configured to up-convert input baseband signals based on the synthesized frequency provided by the synthesizer circuitry 706*d* to generate RF output signals for the FEM circuitry 708. The baseband signals may be provided by the baseband circuitry 510/610 and may be filtered by filter circuitry 706*c*.

In some embodiments, the mixer circuitry 706*a* of the receive signal path and the mixer circuitry 706*a* of the transmit signal path may include two or more mixers and may be arranged for quadrature downconversion and upconversion, respectively. In some embodiments, the mixer circuitry 706*a* of the receive signal path and the mixer circuitry 706*a* of the transmit signal path may include two or more mixers and may be arranged for image rejection (e.g., Hartley image rejection). In some embodiments, the mixer circuitry 706*a* of the receive signal path and the mixer circuitry 706*a* may be arranged for direct downconversion and direct upconversion, respectively. In some embodiments, the mixer circuitry 706*a* of the receive signal path and the mixer circuitry 706*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 510/610 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706*d* may be a fractional-N synthesizer or a fractional N/N+1 synthesizer, although the scope of the embodiments is not limited in this respect as other types of frequency synthesizers may be suitable. For example, synthesizer circuitry 706*d* may be a delta-sigma synthesizer, a frequency multiplier, or a synthesizer comprising a phase-locked loop with a frequency divider.

The synthesizer circuitry 706*d* may be configured to synthesize an output frequency for use by the mixer circuitry 706*a* of the RF circuitry 706 based on a frequency input and a divider control input. In some embodiments, the synthesizer circuitry 706*d* may be a fractional N/N+1 synthesizer.

In some embodiments, frequency input may be provided by a voltage controlled oscillator (VCO), although that is not a requirement. Divider control input may be provided by either the baseband circuitry 510/610 or the applications processor 505/605 depending on the desired output frequency. In some embodiments, a divider control input (e.g., N) may be determined from a look-up table based on a channel indicated by the applications processor 505/605.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 711, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 711. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 711).

Processors of the application circuitry 505/605 and processors of the baseband circuitry 510/610 may be used to execute elements of one or more instances of a protocol stack. For example, processors of the baseband circuitry 510/610, alone or in combination, may be used execute Layer 3, Layer 2, or Layer 1 functionality, while processors of the baseband circuitry 510/610 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
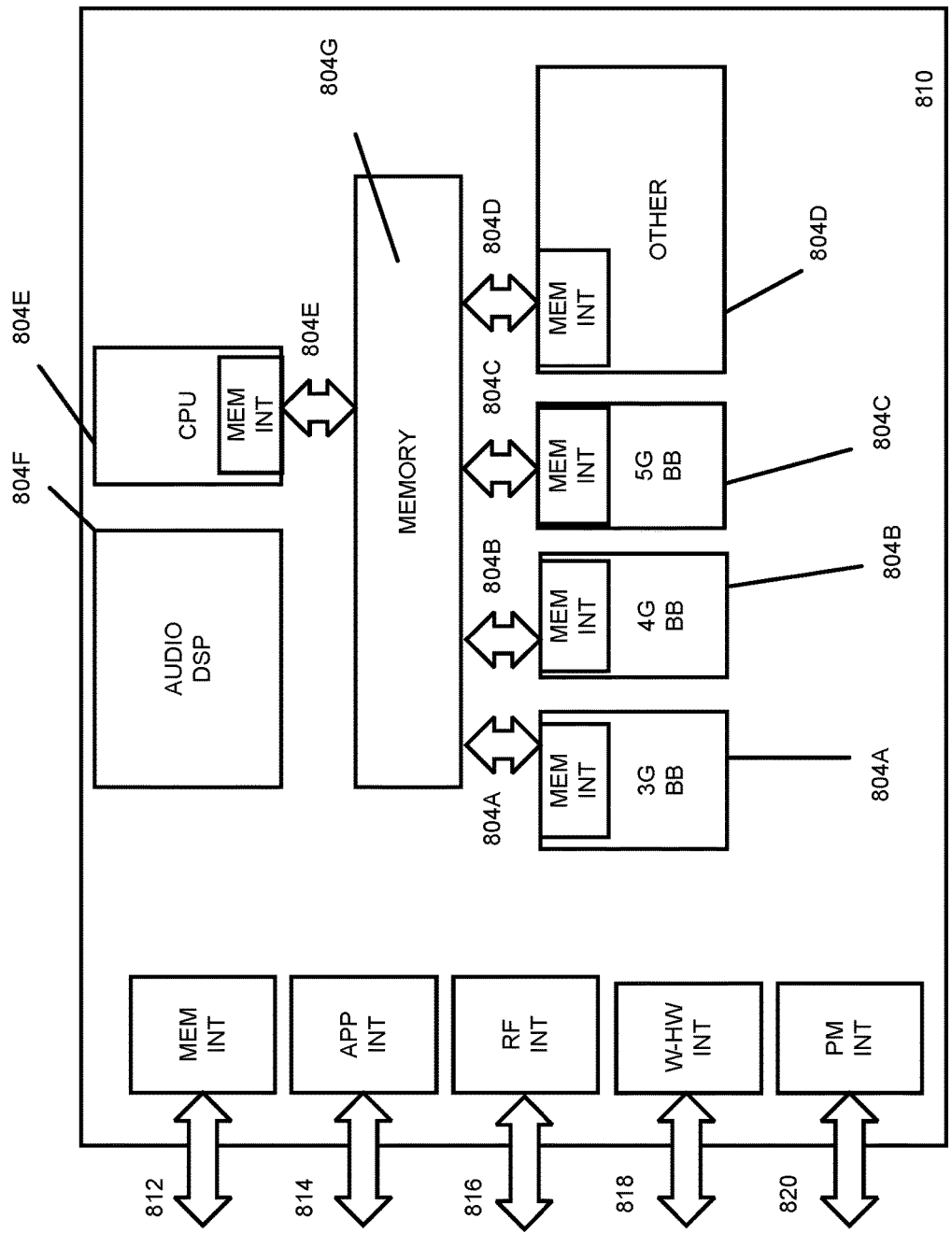
FIG. 8 illustrates example interfaces of baseband circuitry in accordance with various embodiments.

FIG. 8 illustrates example interfaces of baseband circuitry in accordance with various embodiments. As discussed above, the baseband circuitry 510/610 of FIGS. 5-7 may comprise processors 704A-704E and a memory 704G utilized by said processors. Each of the processors 704A-704E may include a memory interface, 804A-804E, respectively, to send/receive data to/from the memory 704G.

The baseband circuitry 510/610 may further include one or more interfaces to communicatively couple to other circuitries/devices, such as a memory interface 812 (e.g., an interface to send/receive data to/from memory external to the baseband circuitry 510/610), an application circuitry interface 814 (e.g., an interface to send/receive data to/from the application circuitry 505/605 of FIGS. 5-7), an RF circuitry interface 816 (e.g., an interface to send/receive data to/from RF circuitry 706 of Figure XT2), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMIC 625.

Figure 9:
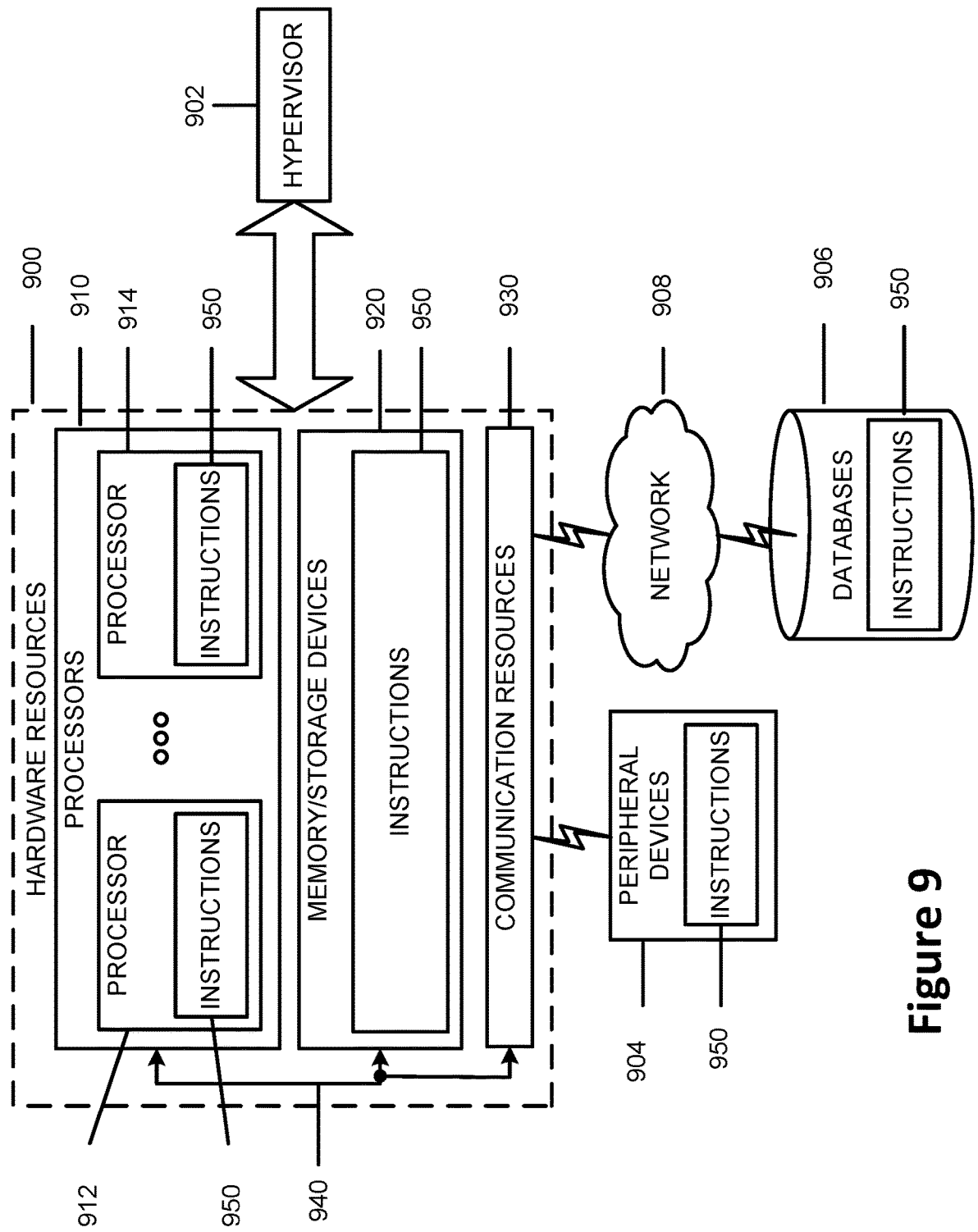
FIG. 9 is a block diagram illustrating components, according to some example embodiments, able to read instructions from a machine-readable or computer-readable medium (for example, a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 902 may be executed to provide an execution environment for one or more network slices/sub-slices to utilize the hardware resources 900. A "virtualized resource" may refer to compute, storage, and/or network resources provided by virtualization infrastructure to an application, device, system, etc.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 includes a method of operating a UE, the method comprising determining that the UE is not configured with a pathloss reference reference signal (RS) parameter; selecting, based on said determination that the UE is not configured with the pathloss reference RS parameter, a synchronization signal block (SSB) resource in which the UE has successfully decoded master information block (MIB) information as a pathloss reference resource; and calculating a sounding reference signal (SRS) transmission power based on the SSB resource.

Example 2 may include the method of example 1 or some other example herein, wherein determining that the UE is not configured with the pathloss reference RS parameter, comprises checking an availability of the pathloss reference RS parameter within an SRS resource set from radio resource control (RRC) signaling.

Example 3 may include the method of example 2 or some other example herein, further comprising transmitting an SRS on an SRS resource from the SRS resource set.

Example 4 may include the method of example 1 or some other example herein, further comprising transmitting an SRS with the SRS transmission power.

Example 5 may include the method of example 1 or some other example herein, further comprising determining a downlink pathloss estimate using the pathloss reference resource; and calculating the SRS transmission power based on the downlink pathloss estimate.

Example 6 may include the method of example 5 or some other example herein, further comprising determining the downlink pathloss estimate using a synchronization signal (SS)/physical broadcast channel (PBCH) index that corresponds to the SSB resource.

Example 7 may include the method of example 5 or some other example herein, wherein determining the downlink pathloss estimate comprises: measuring a reference signal receive power (RSRP) of the SSB resource; determining a configured transmit power for an SSB transmitted on the SSB resource based on radio resource control (RRC) signaling; and comparing the measured RSRP to the configured transmit power.

Example 8 may include a method comprising storing parameters configured by radio resource control (RRC) signaling; and processing circuitry coupled with the memory, the processing circuitry to: determining the stored parameters do not include a pathloss reference reference signal (RS) parameter; selecting, based on said determination that the stored parameters do not include a pathloss reference RS parameter, a synchronization signal block (SSB) resource in which the UE has successfully decoded master information block (MIB) information as a pathloss reference resource; and calculating a sounding reference signal (SRS) transmission power based on the SSB resource.

Example 9 may include the method of example 8 or some other example herein, further comprising generating an SRS for transmission with the SRS transmission power.

Example 10 may include the method of example 8 or some other example herein, wherein the pathloss reference RS parameter comprises an RS index.

Example 11 may include the method of example 8 or some other example herein, further comprising determining a downlink pathloss estimate using the pathloss reference resource; and calculating the SRS transmission power based on the downlink pathloss estimate.

Example 12 may include the method of example 11 or some other example herein, wherein determining the downlink pathloss estimate comprises: measuring a reference signal receive power (RSRP) of the SSB resource; determining a configured transmit power for an SSB transmitted on the SSB resource based on radio resource control (RRC) signaling; and comparing the measured RSRP to the configured transmit power.

Example 13 may include a method comprising: determine a UE is not configured with a plurality of parameters, the plurality of parameters including a spatial relation information parameter and a pathloss reference reference signal (RS) parameters; selecting, based on said determining, a synchronization signal block (SSB) resource in which the UE successfully decoded master information block (MIB) information as a spatial downlink reference resource; and generating a physical uplink control channel (PUCCH) transmission based on the spatial downlink reference resource.

Example 14 may include the method of example 13 or some other example herein, further comprising: utilizing a spatial domain filter used for downlink reception of the spatial downlink reference resource for the PUCCH transmission.

Example 15 may include the method of example 13 or some other example herein, wherein the method further comprises measuring a pathloss for a downlink reference resource; and determining, based on the measured pathloss, an uplink power for the PUCCH transmission.

Example 16 may include the method of example 15 or some other example herein, further comprising measuring the pathloss when there is no synchronization signal block in an active bandwidth part.

Example 17 may include the method of example 15 or some other example herein, wherein the PUCCH transmission is to be transmitted in a first component carrier and the SSB resource is in a second component carrier.

Example 18 may include a method comprising: determining the UE is not configured with a plurality of parameters, the plurality of parameters including a spatial relation information parameter and a pathloss reference reference signal (RS) parameters; selecting, based on said determining, channel state information signal-reference signal (CSI-RS) that is spatially quasi-colocated with a synchronization signal block (SSB) resource as a spatial downlink reference resource; and generating a physical uplink control channel (PUCCH) transmission based on the spatial downlink reference resource.

Example 19 may include the method of example 18 or some other example herein, wherein the SSB resource is one in which the UE was able to successfully decode a master information block.

Example 20 may include the method of example 18 or some other example herein, wherein the SSB resource is in a first bandwidth part and the CSI-RS is in a second bandwidth part that does not contain an SSB, wherein the second bandwidth part is active at a time in which the UE is to select the CSI-RS as the spatial downlink reference resource.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 22 may include an apparatus comprising logic, modules, or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a signal as described in or related to any of examples 1-20, or portions or parts thereof.

Example 26 may include a signal in a wireless network as shown and described herein.

Example 27 may include a method of communicating in a wireless network as shown and described herein.

Example 28 may include a system for providing wireless communication as shown and described herein.

Example 29 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed by one or more processors, cause a user equipment (UE) to:
   determine that the UE is not configured with a pathloss reference reference signal (RS) parameter;
   select, based on said determination that the UE is not configured with the pathloss reference RS parameter, a synchronization signal block (SSB) resource in which the UE has successfully decoded master information block (MIB) information as a pathloss reference resource; and
   calculate a sounding reference signal (SRS) transmission power based on the SSB resource.

2. The one or more non-transitory, computer-readable media of claim 1, wherein to determine that the UE is not configured with the pathloss reference RS parameter, the UE is to check an availability of the pathloss reference RS parameter within an SRS resource set from radio resource control (RRC) signaling.

3. The one or more non-transitory, computer-readable media of claim 2, wherein the instructions, when executed, further cause the UE to:
   transmit an SRS on an SRS resource from the SRS resource set.

4. The one or more non-transitory, computer-readable media of claim 1, wherein the instructions, when executed, further cause the UE to:
   transmit an SRS with the SRS transmission power.

5. The one or more non-transitory, computer-readable media of claim 1, wherein the instructions, when executed, further comprise:
   determine a downlink pathloss estimate using the pathloss reference resource; and
   calculate the SRS transmission power based on the downlink pathloss estimate.

6. The one or more non-transitory, computer-readable media of claim 5, wherein the UE is to determine the downlink pathloss estimate using a synchronization signal (SS)/physical broadcast channel (PBCH) index that corresponds to the SSB resource.

7. The one or more non-transitory, computer-readable media of claim 5, wherein to determine the downlink pathloss estimate, the UE is to:
   measure a reference signal receive power (RSRP) of the SSB resource;
   determine a configured transmit power for an SSB transmitted on the SSB resource based on radio resource control (RRC) signaling; and
   compare the measured RSRP to the configured transmit power.

8. An apparatus comprising:
   memory to store parameters configured by radio resource control (RRC) signaling; and
   processing circuitry coupled with the memory, the processing circuitry to:
      determine the stored parameters do not include a pathloss reference reference signal (RS) parameter;
      select, based on said determination that the stored parameters do not include a pathloss reference RS parameter, a synchronization signal block (SSB) resource in which the UE has successfully decoded master information block (MIB) information as a pathloss reference resource; and
      calculate a sounding reference signal (SRS) transmission power based on the SSB resource.

9. The apparatus of claim 8, wherein the processing circuitry is further to generate an SRS for transmission with the SRS transmission power.

10. The apparatus of claim 8, wherein the pathloss reference RS parameter comprises an RS index.

11. The apparatus of claim 8, wherein the processing circuitry is further to:
   determine a downlink pathloss estimate using the pathloss reference resource; and
   calculate the SRS transmission power based on the downlink pathloss estimate.

12. The apparatus of claim 11, wherein to determine the downlink pathloss estimate, the processing circuitry is to:
   measure a reference signal receive power (RSRP) of the SSB resource;
   determine a configured transmit power for an SSB transmitted on the SSB resource based on radio resource control (RRC) signaling; and
   compare the measured RSRP to the configured transmit power.

* * * * *